(12) United States Patent
Boland

(10) Patent No.: US 9,623,842 B2
(45) Date of Patent: Apr. 18, 2017

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 228 days.

(21) Appl. No.: 14/354,800

(22) PCT Filed: Oct. 26, 2011

(86) PCT No.: PCT/EP2011/068732
§ 371 (c)(1),
(2), (4) Date: Apr. 28, 2014

(87) PCT Pub. No.: WO2013/060364
PCT Pub. Date: May 2, 2013

(65) Prior Publication Data
US 2014/0317877 A1    Oct. 30, 2014

(51) Int. Cl.
*B60S 1/38*    (2006.01)
(52) U.S. Cl.
CPC .............. *B60S 1/38* (2013.01); *B60S 1/3808* (2013.01); *B60S 1/3877* (2013.01)
(58) Field of Classification Search
CPC .... B60S 1/3808; B60S 1/3877; B60S 1/3881; B60S 1/38; B60S 1/3874; B60S 1/3875; B60S 2001/3836; B60S 2001/3827
USPC .................................................... 15/250.201
See application file for complete search history.

(56) References Cited

U.S. PATENT DOCUMENTS

| | | |
|---|---|---|
| 3,116,510 A | 1/1964 | Oishei et al. |
| 3,320,628 A | 5/1967 | Bacher et al. |
| 3,636,583 A | 1/1972 | Rosen |
| 5,564,157 A | 10/1996 | Kushida et al. |
| 5,862,567 A | 1/1999 | Kim |
| 6,055,697 A * | 5/2000 | Wollenschlaeger ...... B60S 1/38 15/250.32 |
| 7,228,588 B2 | 6/2007 | Kraemer |
| 7,540,061 B1 * | 6/2009 | Huang .................. B60S 1/3881 15/250.201 |
| 7,540,062 B1 * | 6/2009 | Huang .................... B60S 1/381 15/250.201 |

(Continued)

FOREIGN PATENT DOCUMENTS

| | | |
|---|---|---|
| DE | 19827032 A1 | 12/1998 |
| DE | 102005054142 A1 | 5/2007 |

(Continued)

*Primary Examiner* — Andrew A Horton
(74) *Attorney, Agent, or Firm* — Robert L. Stearns; Dickinson Wright, PLLC

(57) ABSTRACT

A windscreen wiper device of the flat blade type includes an elastic, elongated carrier element, as well as an extruded elongated wiper blade of a flexible material, which wiper blade includes a central longitudinal groove, in which groove a longitudinal strip of the carrier element is disposed. The groove extends in downward direction beneath the longitudinal strip for forming a longitudinal hollow channel defined by the longitudinal strip and a bottom of the groove. The height of the hollow channel at the location of a middle longitudinal plane of the wiper blade perpendicular to the windscreen to be wiped is defined by: $\frac{1}{40} W \leq H \leq \frac{1}{5} W$, wherein W is a width of the longitudinal strip, and wherein H is a height of the hollow channel at the location of a middle longitudinal plane of the wiper blade perpendicular to the windscreen to be wiped.

3 Claims, 2 Drawing Sheets

(56) References Cited

U.S. PATENT DOCUMENTS

Figure 1:
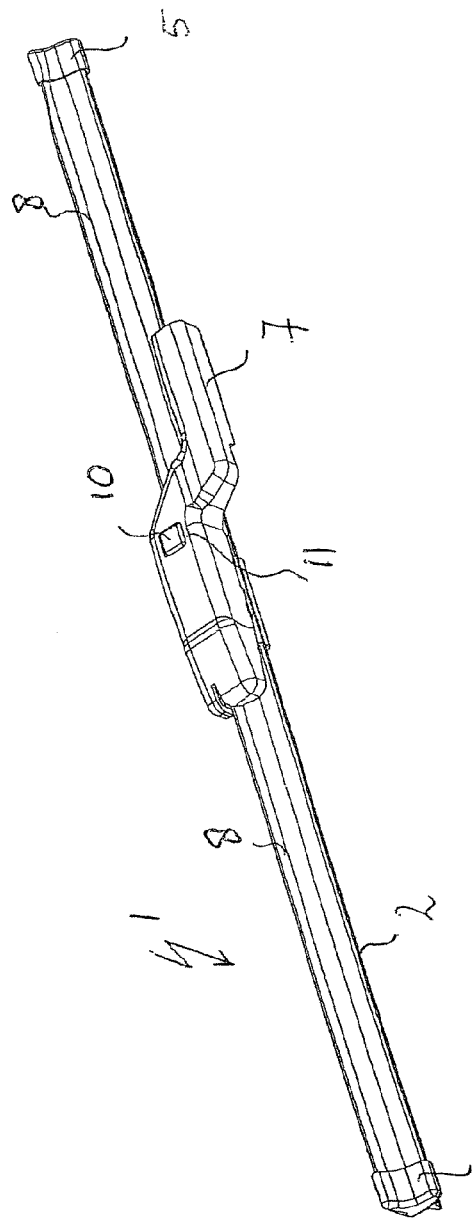
Figure 1:
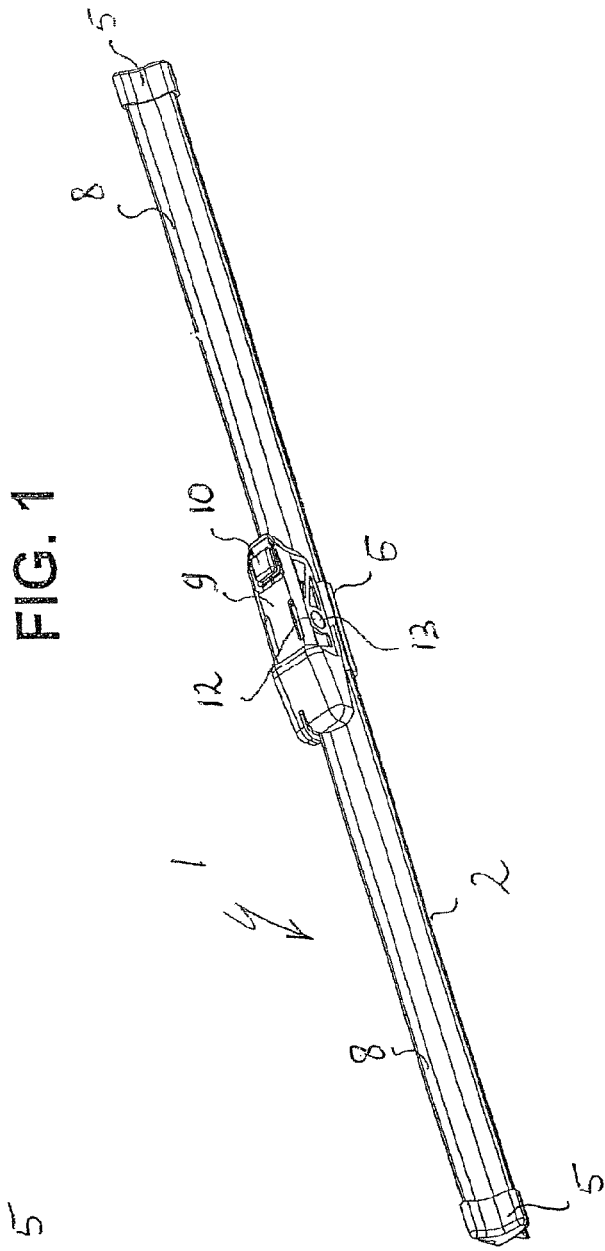

| | | | |
|---|---|---|---|
| 7,568,258 B2 | 8/2009 | Jeuffe | |
| 8,327,499 B2 | 12/2012 | Boland | |
| 2007/0174989 A1* | 8/2007 | Moll | B60S 1/38 15/250.201 |
| 2008/0150193 A1* | 6/2008 | Walworth | B29C 33/76 264/310 |
| 2010/0251501 A1 | 10/2010 | Boland | |
| 2012/0054977 A1 | 3/2012 | Boland | |

FOREIGN PATENT DOCUMENTS

| | | | |
|---|---|---|---|
| EP | 1964733 | A1 | 9/2008 |
| EP | 2236364 | A1 | 10/2010 |
| ES | 2452468 | T3 | 4/2014 |
| GB | 2005532 | A | 4/1979 |

* cited by examiner

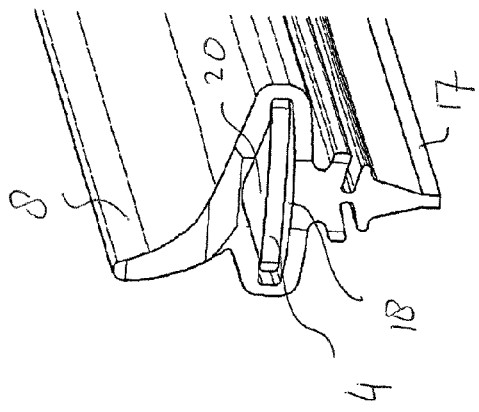
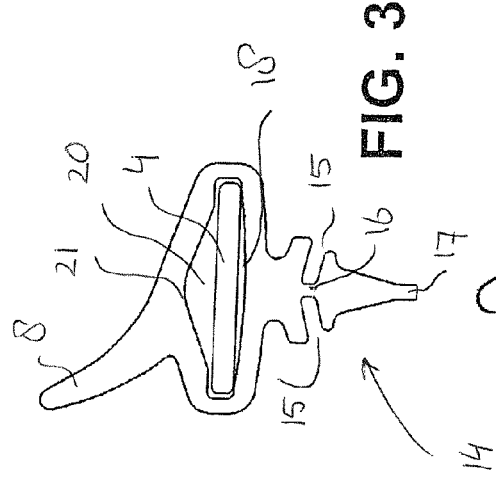
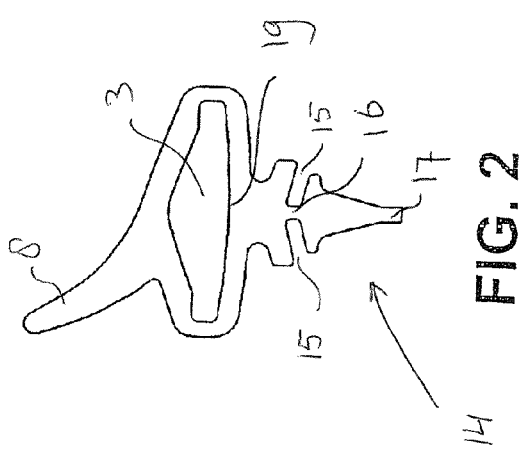
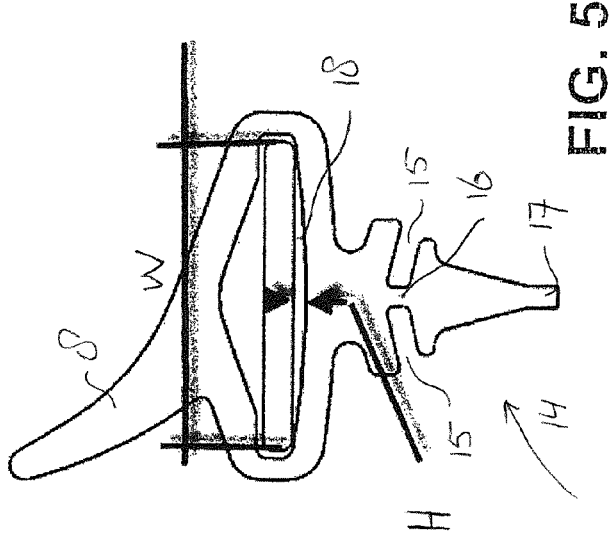
FIG. 2
FIG. 3
FIG. 4
FIG. 5

WINDSCREEN WIPER DEVICE

BACKGROUND OF THE INVENTION

1. Technical Field

The present invention relates to a windscreen wiper device of the flat blade type comprising an elastic, elongated carrier element, as well as an extruded elongated wiper blade of a flexible material, the wiper blade comprising a wiping element which can be placed in abutment with a windscreen to be wiped, which wiper blade includes a central longitudinal groove, in which groove a longitudinal strip of the carrier element is disposed, which windscreen wiper device comprises a connecting device for an oscillating arm, wherein the oscillating arm can be pivotally connected to the connecting device about a pivot axis near one end thereof.

Such a windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature.

SUMMARY OF THE INVENTION

The object of the invention is to provide an improved windscreen wiper device.

In order to accomplish that objective, a windscreen wiper device of the type referred to in the introduction is characterized according to the invention in that the groove extends in downward direction beneath the longitudinal strip for forming a longitudinal hollow channel defined by the longitudinal strip and a bottom of the groove, wherein a height of the hollow channel at the location of a middle longitudinal plane of the wiper blade perpendicular to the windscreen to be wiped is defined by:

$$\frac{1}{40}W \leq H \leq \frac{1}{5}W,$$

wherein W is a width of the longitudinal strip, and wherein H is a height of the hollow channel at the location of a middle longitudinal plane of the wiper blade perpendicular to the windscreen to be wiped.

First of all, the present windscreen wiper device can be used for large varieties of windscreens to be wiped mutually differing in their curvatures. Indeed, the hollow channel or "gap" between the longitudinal strip and the bottom of the groove generates a flexibility of the bottom and thus a variation of the position of the wiping element in a direction perpendicular to the windscreen to be wiped, so that these differences in curvature may be compensated. Secondly, any tolerances in windscreen shapes may thus be compensated as well.

According to the invention the height of the "gap" may vary, dependent on the pressure exerted by the oscillating arm on the wiper blade. Thus, the wiper blade being made of a flexible material, particularly rubber, may deform in accordance with the pressure, so that the "gap" between the longitudinal strip and the bottom of the groove may decrease in case of an increase of the pressure or may increase in case of a decrease of the pressure. Hence, the wiper properties are improved, as hazing is avoided at a location of a centre of the wiper blade at high pressures exerted by the oscillating arm. Extensive experiments and tests have made clear that the above defined range for the height of the "gap" at the location of the middle longitudinal plane of the wiper blade perpendicular to the windscreen to be wiped, is very advantageous. When the height of the "gap" is larger than indicated, the stability of the wiper blade is negatively affected, as tests have shown that—besides a vertical movement of the wiping element—also a rotational movement thereof will be generated. Such a rotation will negatively influence the so-called "attack angle" of the wiping element on the windscreen to be wiped. Consequently, the wiping properties will be damaged. In the event that the height of the "gap" is smaller than indicated, the variation of the position of the wiping element in a direction perpendicular to the windscreen to be wiped, i.e. the vertical movement of the wiping element, will be too small to have any positive effect on the repartition of the pressure on the wiping element, as exerted by the oscillating arm.

In a preferred embodiment of a windscreen wiper device in accordance with the invention said groove extends in upward direction above the longitudinal strip for forming a longitudinal hollow channel defined by the longitudinal strip and an upper surface of the groove.

In another preferred embodiment of a windscreen wiper device according to the invention the wiper blade is provided with a spoiler at a side thereof facing away from a windscreen to be wiped.

THE DRAWINGS

The invention will now be explained more in detail with reference to figures illustrated in a drawing, wherein:

FIG. 1 is a perspective, schematic view of a preferred embodiment of a windscreen wiper device according to the invention, with and without an oscillating arm, respectively; and FIGS. 2 through 5 show several cross-sectional views of a wiper blade as used in a windscreen wiper device of FIG. 1.

DETAILED DESCRIPTION

FIG. 1 shows a preferred variant of a windscreen wiper device 1 of the flat blade type according to the invention. The windscreen wiper device 1 is built up of an elastomeric wiper blade 2 comprising a central or middle longitudinal groove 3, wherein a central or middle longitudinal strip 4 made of spring band steel is fitted in the longitudinal groove 3 (see FIGS. 2 through 5). The strip 4 forms a flexible carrier element for the rubber wiper blade 2, as it were, which is thus biased in a curved position (the curvature in operative position being that of a windscreen to be wiped). An end of the strip 4 and/or an end of the wiperblade 2 may be connected on either side of the windscreen wiper device 1 to respective connecting pieces or "end caps" 5. In this embodiment, the connecting pieces 5 are separate constructional elements, which may be form-locked, as well as force-locked to both ends of the strip 4/the wiper blade 2. In another preferred variant, the connecting pieces 5 are in one piece with the strip 4 made of spring band steel. The windscreen wiper device 1 is furthermore built up of a connecting device 6 for connecting an oscillating wiper arm 7 thereto. The oscillating wiper arm 7 can be pivotally connected to the connecting device 6 about a pivot axis near one end. The preferred embodiment of FIG. 1 according to the invention comprises a spoiler or "air deflector" 8 which is made in one piece with the rubber wiper blade 2 and which extends along the entire length thereof. The connecting device 6 with the wiper blade 2 is mounted onto the oscillating arm 7 as follows. A joint part 9 being already clipped onto the connecting device 6 is pivoted relative to the connecting device 6, so that the joint part 9 can be easily slided on a free end of the oscillating arm 7. During this sliding movement a resilient tongue 10 of the joint part 9 is initially pushed in against a spring force and then allowed to spring back into a hole 11 of the oscillating arm 7, thus snapping, that is clipping the resilient tongue 10 into the hole 11. This is a so-called bayonet-connection. The oscillating arm 7 together with the joint part 9 may then be pivoted back in a position parallel to the wiper blade 2 in order to be ready for use. By subsequently pushing in again the resilient tongue 10 against the spring force (as if it were a push button), the connecting device 6 and the joint part 9 together with the wiper blade 2 may be released from the oscillating arm 7. Dismounting the connecting device 6 with the wiper blade 2 from the oscillating arm 7 is thus realized by sliding the connecting device 6 and the joint part 9 together with the wiper blade 2 in a direction away from the oscillating arm 7. The connecting device 6 comprises two cylindrical protrusions 12 extending outwards on either side of the connecting device 6. These protrusions 12 pivotally engage in identically shaped cylindrical recesses 13 of the plastic joint part 9. The protrusions 12 act as bearing surfaces at the location of the pivot axis in order to pivot the joint part 9 (and the oscillating arm 7 attached thereto) about the pivot axis near one end of the oscillating arm 7.

Although not shown in FIG. 1, but fully understood by a skilled person, the oscillating arm 7 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 6 moves the wiper blade 2.

With reference to FIGS. 2 through 5 the wiper blade 2 comprises a wiping element 14. The wiping element 14 consists of two tilting web grooves 15 defining a strip-like tilting web 16 between them, as well as a downwardly extending wiping lip 17 on the tilting web 16. The wiping lip 17 rests with its free end on a windscreen to be wiped. In action the wiping lip 17, as if it were a hinge, tilts in its oscillation reversal positions.

As can be seen in FIGS. 2 through 5, the central groove 3 extends in downward direction beneath the longitudinal strip 4 for forming a longitudinal hollow channel 18 defined by the longitudinal strip 4 and a bottom 19 of the groove 3. The central groove 3 also extends in upward direction above the longitudinal strip 4 for forming a longitudinal hollow channel 20 defined by the longitudinal strip 4 and an upper surface 21 of the groove 3. This is realized for facilitating insertion of the longitudinal strip 4 inside the groove 3 and for reducing the amount of raw material used in order to minimize costs and weight.

The magnitude of the pressure is dependent, for example, on the curvature of a windscreen to be wiped, the curvature of the longitudinal strip 4, as well as on the force of a spring mounted between the mounting head and the oscillating arm 7. In case a relatively low pressure is exerted by the oscillating arm 7, that is by the longitudinal strip 4 on the wiper blade 2, the height H or "gap" of the hollow channel 18 may increase. The flexible bottom is in that case bent outwardly, so that the wiping element 14 is in that case in a position facing away from the longitudinal strip 4. The wiping element 14 is allowed to follow its normal oscillatory movement. In a situation when a relatively high pressure is exerted by the longitudinal strip 4 on the wiper blade 2. In that particular case the height H or "gap" of the hollow channel 18 may decrease. The flexible bottom is in that case bent inwardly, so that the wiping element 14 is forced into a position facing towards the longitudinal strip 4. In other words, due to the resiliency of the bottom 19 of the groove 3, the wiping element 14 is allowed to move in a direction perpendicular to a windscreen to be wiped, dependent on the pressure exerted by the longitudinal strip 4 on the wiper blade 2.

With reference to FIG. 5, according to the invention the height H of the hollow channel 18 at the location of a middle longitudinal plane of the wiper blade 2 perpendicular to the windscreen to be wiped is defined by:

$$\frac{1}{40}W \leq H \leq \frac{1}{5}W,$$

wherein W is a width of the longitudinal strip 4, and wherein H is a height of the hollow channel 18 at the location of the middle longitudinal plane of the wiper blade 2 perpendicular to the windscreen to be wiped.

As can be seen from FIG. 5, the width W of the longitudinal strip 4 is measured from one exterior longitudinal side of the longitudinal strip 4 to the other exterior longitudinal side of the longitudinal strip 4. The height H or "gap" of the hollow chamber 18 is measured at the location of the middle longitudinal plane of the wiper blade 2 perpendicular to the windscreen to be wiped from the bottom 19 of the hollow channel 18 to the longitudinal strip 4.

The invention is not restricted to the variants shown in the drawing, but it also extends to other preferred embodiments that fall within the scope of the appended claims.

The invention claimed is:

1. A windscreen wiper device of the flat blade type comprising an elastic, elongated carrier element, as well as an extruded elongated wiper blade of a flexible material, said wiper blade comprising a wiping element which can be placed in abutment with a windscreen to be wiped, which wiper blade includes a central longitudinal groove, in which groove a longitudinal strip of the carrier element is disposed, which windscreen wiper device comprises a connecting device for an oscillating arm, said groove extending in a downward direction beneath the longitudinal strip for forming a longitudinal hollow channel defined by said longitudinal strip and a bottom of said groove, wherein the hollow channel has a height defined by a distance between said longitudinal strip and the bottom of said groove in a direction perpendicular to the windscreen to be wiped, wherein said hollow channel has a pair of lateral sides that are generally aligned in a lateral direction with opposing lateral edges of said longitudinal strip, wherein a maximum height of said hollow channel is approximately at the location of a middle longitudinal plane of said wiper blade perpendicular to the windscreen to be wiped and is defined by:

$$\frac{1}{40}W \leq H \leq \frac{1}{5}W,$$

wherein W is a width of the longitudinal strip, and wherein H is the maximum height of the hollow channel approximately at the location of the middle longitudinal plane of said wiper blade perpendicular to the windscreen to be wiped, wherein the width is approximately equal to a maximum width of the hollow channel, wherein the hollow channel is shaped approximately as a semiellipse as viewed in cross-section, and wherein the height of the hollow channel increases continuously from each lateral side of said hollow channel to said maximum height approximately at the location of the middle longitudinal plane of the wiper blade perpendicular to the windscreen to be wiped.

2. A windscreen wiper device according to claim 1, wherein said groove extends an upward direction above the longitudinal strip for forming a longitudinal hollow channel defined by said longitudinal strip and an upper surface of said groove.

3. A windscreen wiper device according to claim 2, wherein said wiper blade is provided with a spoiler at a side thereof facing away from a windscreen to be wiped.

* * * * *